July 14, 1970  K. W. TANTLINGER  3,520,558
SEMITRAILER AND TRACTOR FIFTH WHEEL
Original Filed July 13, 1967  4 Sheets-Sheet 1
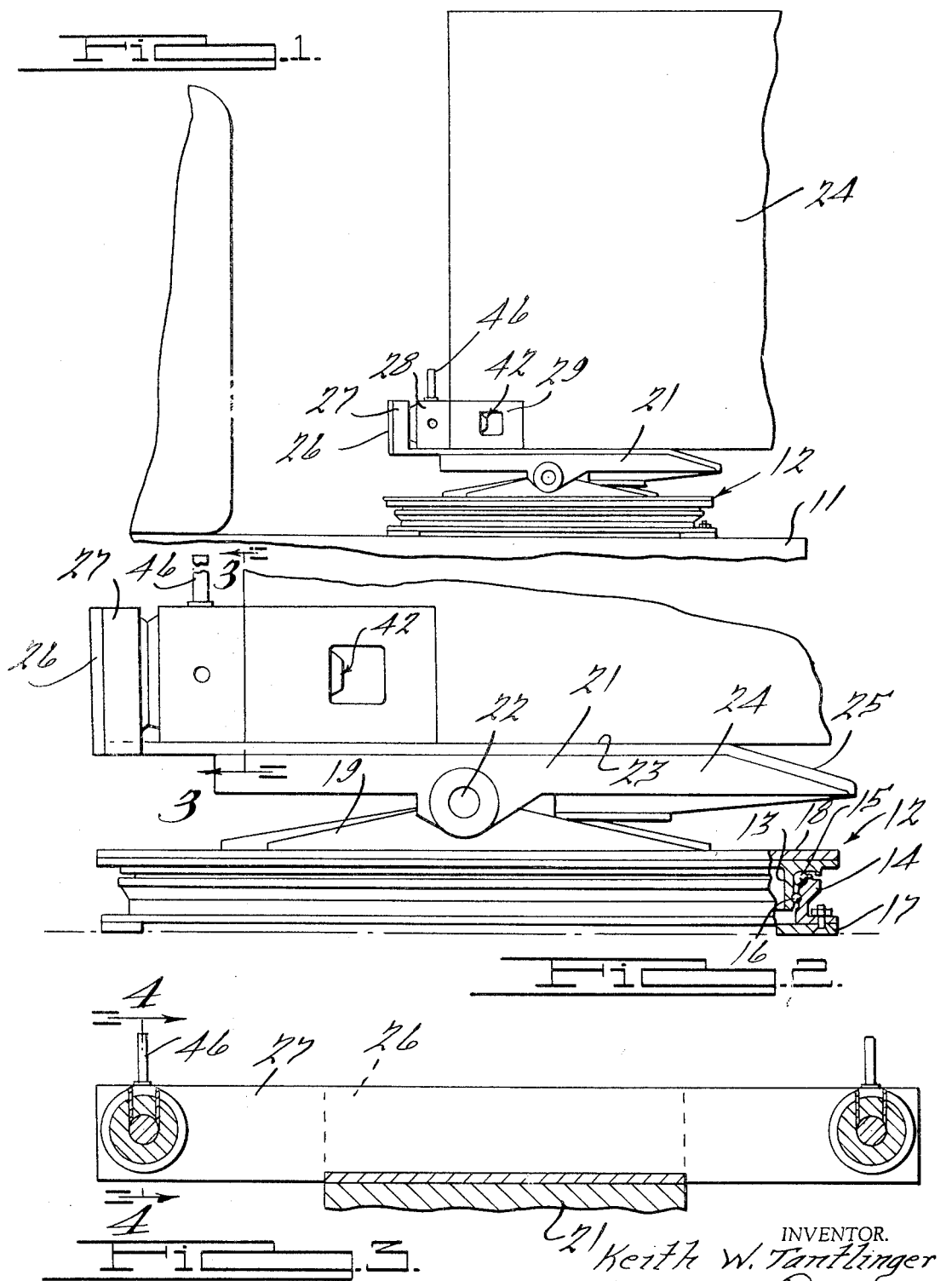
INVENTOR.
Keith W. Tantlinger
BY Harness, Dickey & Pierce
ATTORNEYS.

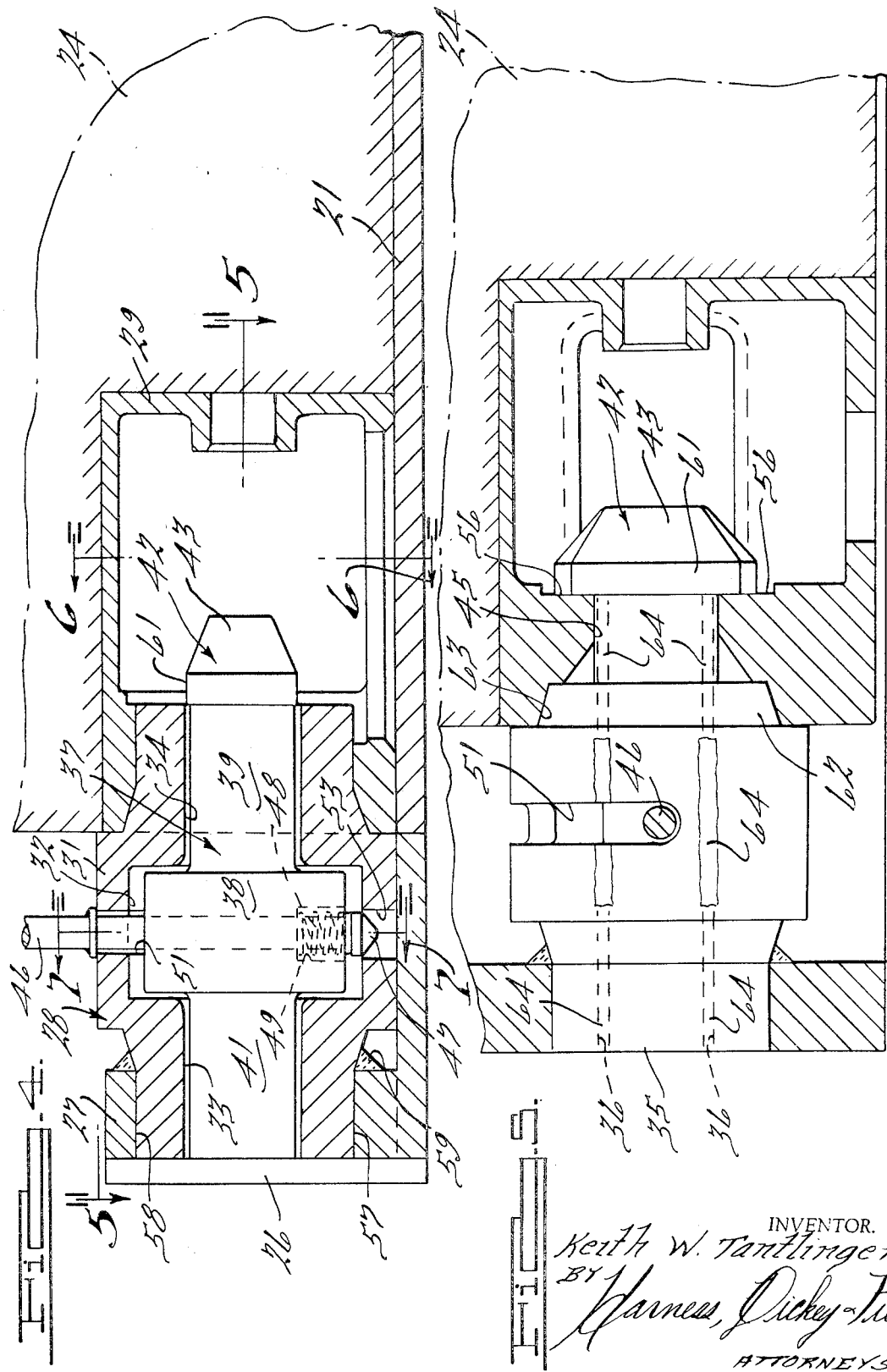

July 14, 1970 K. W. TANTLINGER 3,520,558
SEMITRAILER AND TRACTOR FIFTH WHEEL
Original Filed July 13, 1967 4 Sheets-Sheet 3
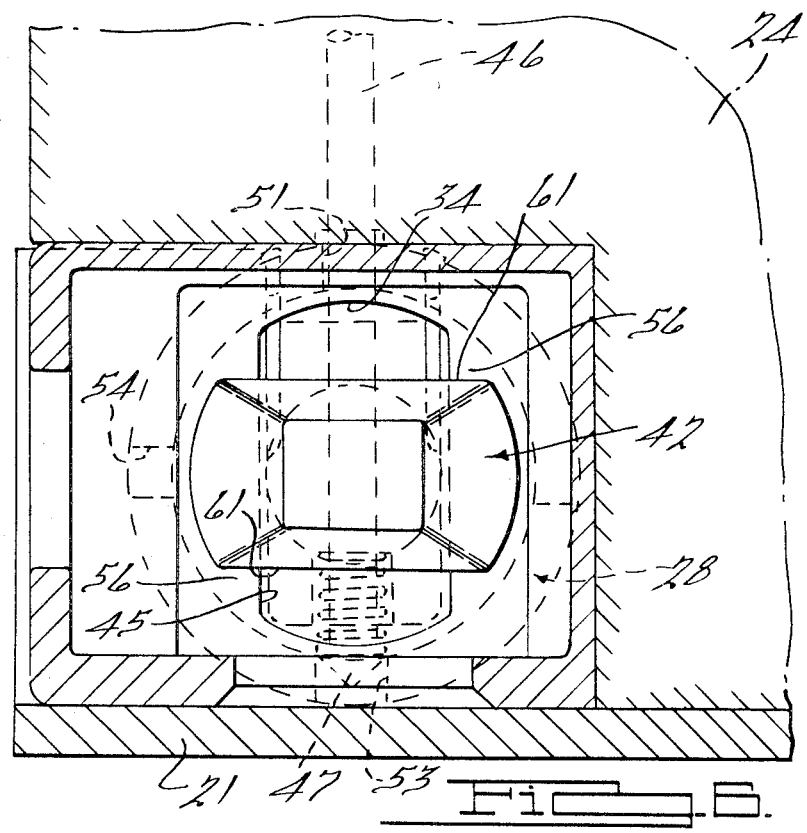
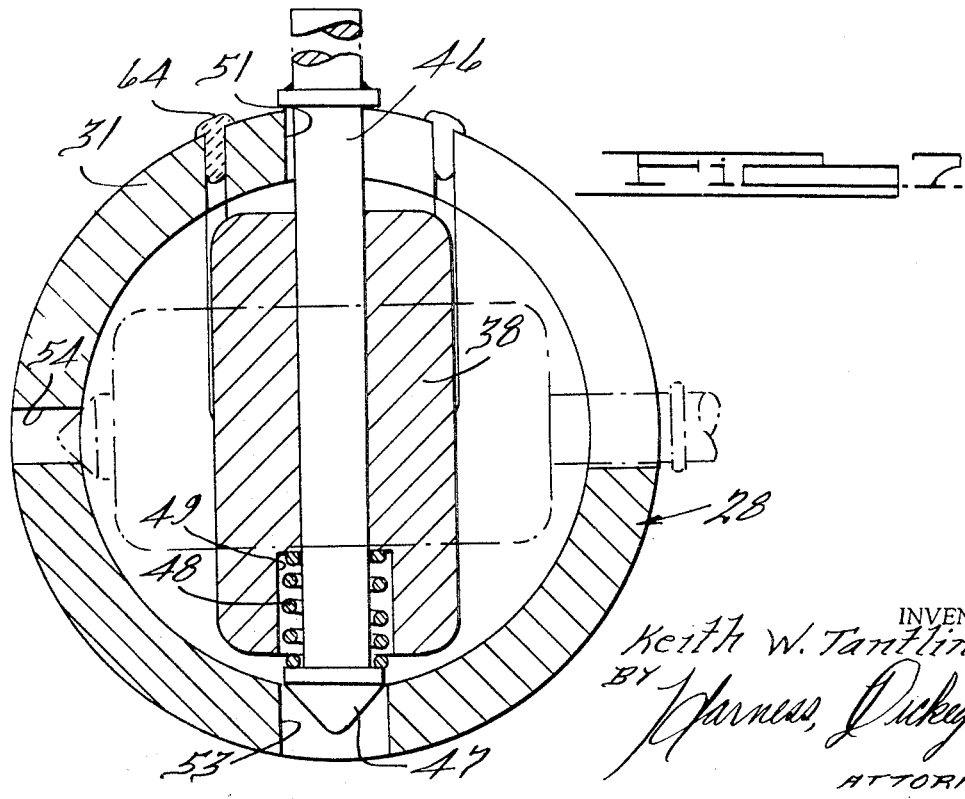
INVENTOR.
Keith W. Tantlinger
BY Harness, Dickey & Pierce
ATTORNEYS.

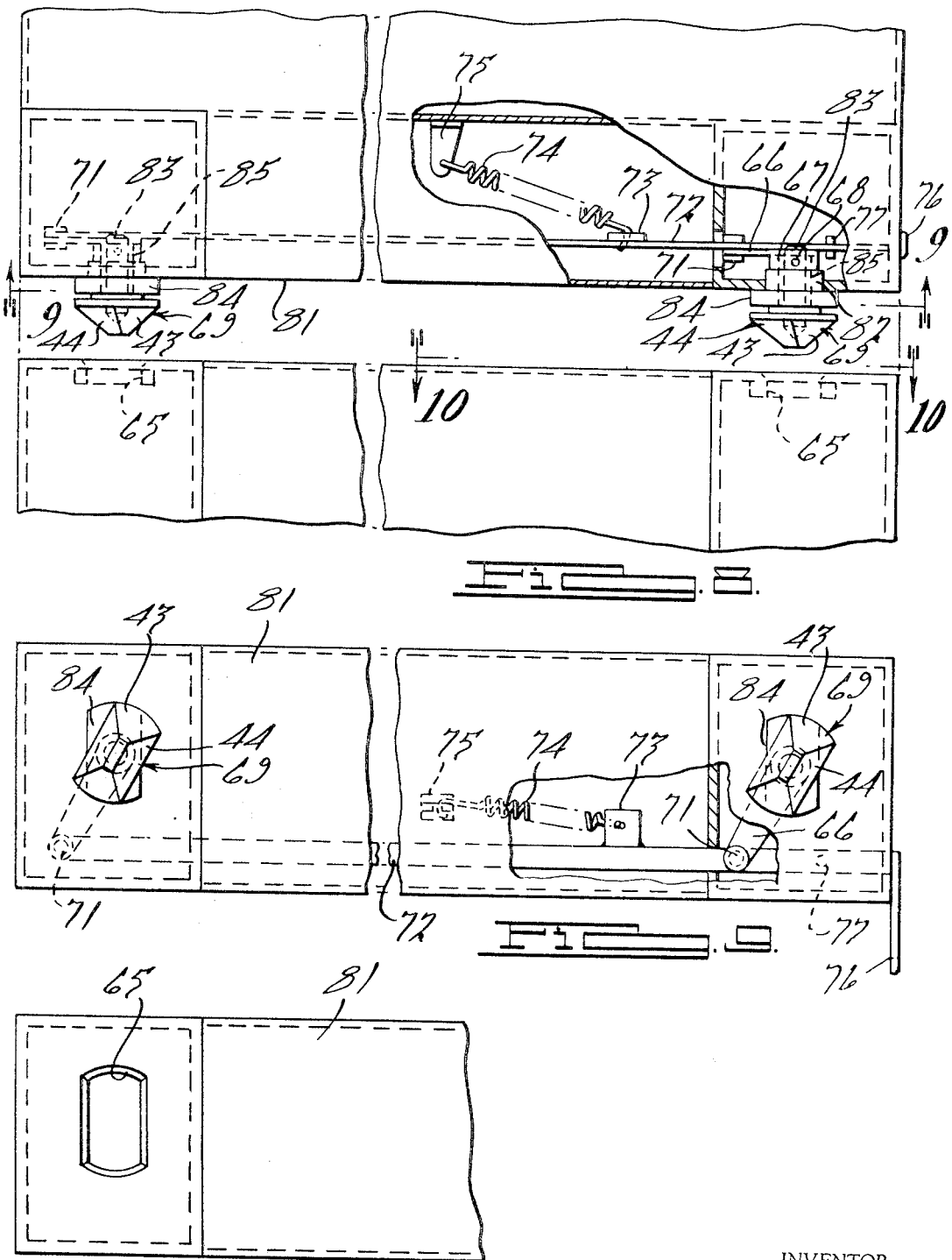

United States Patent Office 3,520,558
Patented July 14, 1970

3,520,558
SEMITRAILER AND TRACTOR FIFTH WHEEL
Keith W. Tantlinger, Grosse Pointe Shores, Mich., assignor to Fruehauf Corporation, Detroit, Mich., a corporation of Michigan
Original application July 13, 1967, Ser. No. 653,164, now Patent No. 3,464,719. Divided and this application May 14, 1969, Ser. No. 824,416
Int. Cl. B62d 53/08
U.S. Cl. 280—434     9 Claims

ABSTRACT OF THE DISCLOSURE

The fifth wheel of the present invention has a ball bearing base for rotation about a vertical axis. A skid plate is mounted on the base for tilting movement about a horizontal axis. A bolster is mounted on the forward end of the skid plate of a length substantially equal to the width of the trailer. A locking pin is mounted on each end of the bolster which projects into apertures in sockets at the forward bottom corners of the trailer which when rotated locks the bolster to the trailer. The bolster on the fifth wheel stabilizes the forward end of the trailer in all angular positions of the tractor relative thereto.

---

This invention relates to fifth wheels and more particularly to a fifth wheel on a tractor which has a bolster thereon having locking means which engages and stabilizes the front end of the trailer and is a division of application of K. W. Tantlinger, Ser. No. 653,164, filed July 13, 1967, for "Semi-Trailer and Tractor Fifth Wheel" now Pat. No. 3,464,719.

BACKGROUND OF THE INVENTION

The invention pertains to pivoted connecting means between a tractor and trailer by which the former may turn relative to the latter when pulling or parking the latter. The fifth wheel of the present invention is an improvement of the fifth wheel illustrated, described and claimed in the patent to K. W. Tantlinger, No. 3,278,198, issued Oct. 11, 1966, for Tractor Fifth Wheel with Service Line Connector, which was assigned to the assignee of the present invention. In the patent a fifth wheel similar to the one of the present application is illustrated in which a kingpin normally provided on the trailer is engaged and locked to the skid plate of the fifth wheel. By employing the transverse bolster on the skid plate of the present invention the trailer body is secured thereto at the front bottom corners thereby attaching the front end of the trailer to the skid plate at a plurality of outboard points rather than at a single central point.

SUMMARY OF THE INVENTION

The fifth wheel of the above indicated patent has a bolster applied to the forward end, parallel to the horizontal axis and of a length substantially equal to the width of the trailer body. Each end of the bolster is provided with a locking pin having a rectangular locking head thereon which projects within a rectangular aperture at the bottom forward corners of the trailer body. The pins are rotated manually or by a spring to be positioned transversely of the apertures to thereby lock the bolster to the trailer body. Securing means are provided for retaining the pin and head in locked and unlocked positions. The bolster stabilizes the truck body relative to the tractor and substantially reduces the possibility of the one tipping relative to the other when disposed in various angular positions to each other.

BRIEF DESCRIPTION OF THE DRAWINGS

FIG. 1 is a broken view of a tractor and trailer joined together by a fifth wheel embodying features of the present invention;

FIG. 2 is an enlarged broken view of the fifth wheel illustrated in FIG. 1;

FIG. 3 is a reduced sectional view of the structure illustrated in FIG. 2, taken on the line 3—3 thereof;

FIG. 4 is an enlarged broken sectional view of the structure illustrated in FIG. 3, taken on the line 4—4 thereof;

FIG. 5 is an enlarged broken sectional view of the structure illustrated in FIG. 4, taken on the line 5—5 thereof;

FIG. 6 is a sectional view of the structure illustrated in FIG. 5, taken on the line 6—6 thereof;

FIG. 7 is an enlarged broken sectional view of the structure illustrated in FIG. 4, taken on the line 7—7 thereof;

FIG. 8 is a broken plan view of a space tractor and trailer joining structure showing another form of the invention;

FIG. 9 is a view of the structure illustrated in FIG. 8, looking from the line 9—9 thereof, and FIG. 10 is a view of a structure illustrated in FIG. 8, looking from the line 10—10 thereof.

DESCRIPTION OF THE PREFERRED EMBODIMENTS

In the figures, a tractor bed 11 supports a fifth wheel 12 which is similar to the fifth wheel of the above mentioned patent having an inner element 13 and a mating outer element 14 containing raceways in which an upper row of balls 15 and a lower row of balls 16 rotate. The element 14 is secured to a base plate 17 and the element 13 supports a top plate 18. The top plate 18 has spaced brackets 19 to which a skid plate 21 is pivoted on a horizontal axis by pivot pins 22 which may be embedded in rubber sleeves, as illustrated in the above patent. The skid plate has a flat top 23 on which the forward end of the trailer 24 is supported. The skid plate 21 has a sloping rearward end 25 which guides the forward end of the trailer thereonto. A slot may be provided centrally of the skid plate for assisting in the alignment of the trailer centrally of the tractor. A retractable pin, similar to a kingpin, can be provided on the bottom of the trailer to assist in its alignment with the center of the skid plate.

The forward end of the skid plate has an upwardly extending flange 26 against which a bolster 27 abuts when secured to the skid plate. The bolster extends transversely of the tractor bed 11 and is of a length to substantially equal the width of the container or trailer body 24. The ends of the bolster 27 have locking heads 28 thereon which extend within sockets 29 at the forward bottom corners of the container or trailer body, as illustrated in FIGS. 4 and 5. Each locking head 28 has a body 31 containing a large cylindrical aperture 32 in the center and communicating aligned end apertures 32 and 33 of substantial less diameter. A lengthwise section 35 is saw cut from the body 31 along the lines 36 to permit the rotatable locking element 37 to be disposed therein. The locking element 37 has a central rectangular portion 38 and forward and rearward cylindrical portions 39 and 41 which are journaled within the apertures 34 and 33, respectively. The portion 39 has a locking head 42 which has a truncated conical portion 43 with two sloping parallel sides 44 providing a substantially rectangular section for entrance through a substantially rectangular aperture 45 in the socket 29. The rectangular body portion 38 has an operating pin 46 extending therethrough along the longest dimension thereof and provided with a conical head 47 on one end against which a spring 48 is urged when disposed in an aperture 49 in the rectangular portion 38. The opposite end of the pin 46 extends through a slot 51 through the wall of the body 31 to permit the rotation of the element 37 thereby, as illustrated in FIG. 7. A washer 52 is welded to the pin 46 for limiting the outward movement of the head 47 by the spring 48. When the head 42 of the locking element 37 is in position to enter the aperture 45 in the socket 29, the head 47 of the pin 46 enters an aperture 53 in the wall of the body 31 which is aligned with the slot 51. When the pin 46 is operated to turn the head 42 to a maximum degree of 90°, as illustrated in FIG. 6, the head 47 moves from the aperture 53 and enters another aperture 54 through the wall of the body 31 to secure the locking element 37 in rotated position. In this position the head 42 engages the areas 56 within the socket 29 to secure the locking head 28 to the socket with the rectangular portion 38 in engagement with the wall of the aperture 32.

One end of the body 31 has a cylindrical surface 57 which extends within a cylindrical aperture 58 in the ends of the bolster 27 to which they are secured as by a weld 59. The opposite end 60 of the body is cylindrical and provided with two oppositely disposed flat walls 61. The end 60 is received within the substantially rectangular aperture 45 after the aligned head 42 passes therethrough. The end 60 extends from a tapered shoulder portion 62 which mates in a tapered recess 63 at the end of the socket for accurately centering the locking head with the center of the socket as it is guided thereinto by the tapered end of the head 42. The end portions of the body 31 have the weld material 64 machined to form smooth cylindrical and tapered surfaces.

The tractor is coupled to the semitrailer 24 in the usual manner, backing the tractor beneath the front end of the semitrailer body. The trailer is centered in some manner as by a retractable pin which engages the slot in the skid plate 21 in the usual manner. The trailer will be more accurately aligned by the passing of the heads 42 through the apertures 45 in the sockets 29 and the engagement of the tapered shoulder portion 62 with the tapered recess 63, as clearly illustrated. The movement of the pin 46 in the slot 51 will rotate the locking element 37 to have the locking head 42 disposed transversely of the apertures 45 in engagement with the areas 56 to couple the bolster to the trailer. In this arrangement the head 47 of the pin 46 will move from the aperture 53 to the aperture 54 and secure the element 37 in locking position. By moving the pin 46 backward in the slot 51 to have the head 47 enter the aperture 53, the head 42 of the elements 37 is released from the areas 56 of the sockets and is moved therefrom when the tractor is separated from the trailer body.

Referring to FIGS. 8, 9 and 10, a further form of the invention is illustrated that wherein a bolster 81, on the skid plate 21, carries a hub 82 at each end which journals a stub shaft 83 on a flanged sleeve bearing 85. The hub on the forward side has a rectangular portion 84 with arcuate end which mates with an aperture 65 of similar shape in a casting at the corners of the container or the trailer body 24. Within the bolster a lever arm 66 has a hub 67 which is secured to the inner ends of the shafts 83 by pins 68. The opposite end of the shafts have a head 69 affixed thereto by a thread, weld or the like. The head 69 is similar to the locking head 42 having a truncated conical portion 43 with two sloping parallel sides 44 for entrance into the aperture 65. The ends of the spaced lever arms 66 are secured by pivots 71 to a rod 72 for operating the lever arms in unison. The rod has a projecting arm 73 to which one end of a spring 74 is secured with the opposite end of the spring secured to a boss 75 attached to the bolster. The rod 72 has an operating handle 76 on the end and a stop pin 77 for limiting the outward movement thereof and aligning the heads 69 with the portions 84 so the head may be withdrawn from the apertures 65.

When a connection is to be made between the bolster and the container or tractor body 24, the heads 69 which are retained in locked position by the spring 74 will be rotated counterclockwise against the spring tension by the walls of the apertures 65. This will permit the heads to pass through the apertures and beyond the thickness of the wall thereof after which they will be moved to an angular position as illustrated in FIG. 10 by the tension of the spring 74 to retain the tractor in fixed relation to the container or trailer body. When the tractor is to be separated from the container or trailer body, the handle 76 is pulled outwardly to align the heads 69 with the aperture 65 so that it will pass therethrough when the tractor is moved outwardly from the container or the tractor body. With this arrangement automatic coupling will occur between the tractor and the container or trailer body when the bolster is backed by the trailer into engagement with the container or trailer body.

What is claimed is:

1. In a fifth wheel, a rotatable base, a tiltable skid plate mounted on the base, a bolster extending transversely across the skid plate, and means carried at each end of said bolster for engaging sockets on a container for securing the container thereto.

2. In a fifth wheel construction as recited in claim 1, wherein said securing means embodies a rotatable element having a locking head which extends into and is movable crosswise of a slot in a socket on a container.

3. In a fifth wheel construction as recited in claim 2, wherein securing means maintains the rotatable element in locked and unlocked positions.

4. In a fifth wheel construction as recited in claim 2, wherein the locking heads are maintained in angular relation to the receiving slot of a socket by spring means.

5. In a fifth wheel construction as recited in claim 4, wherein lever arms are provided on the locking heads, a rod interconnecting the lever arms, said spring means urging the rod and lever arm to maintain the heads in locking position.

6. In a fifth wheel construction as recited in claim 5, wherein a handle means is provided for actuating the rod lever arms for moving the heads to unlocked position.

7. In a tractor semitrailer coupling means, a pivoted skid plate carried by said tractor, a bolster on said skid plate, a rotatable locking head carrier near each end of said bolster, a lever arm carried by said heads, a rod connecting said lever arm, and spring means for moving said lever arm and rods to maintain the heads in locking position.

8. In a coupling device as recited in claim 7, wherein means are provided for moving the rod and lever arms against the tension of the spring means for moving the heads to unlocked position.

9. In a coupling device as recited in claim 8, wherein the forward bottom corners of a semitrailer has apertures for receiving said heads so shaped as to rotate the heads to unlocked position so as to pass therethrough after which they are moved to locking position by said spring means.

References Cited

UNITED STATES PATENTS

| 1,621,592 | 3/1927 | Land | 280—421 |
| 3,125,965 | 3/1964 | De Penti. | |
| 3,111,341 | 11/1963 | Fujioka et al. | 296—65 |
| 3,278,198 | 10/1966 | Tantlinger | 280—421 |
| 3,294,420 | 12/1966 | Martin | 280—415 |
| 3,331,333 | 7/1967 | Coulson | 105—366 |

LEO FRIAGLIA, Primary Examiner

U.S. Cl. X.R.

280—438